Nov. 6, 1956   W. BROWN   2,769,354
EPICYCLIC CHANGE SPEED GEARS
Filed Sept. 29, 1955   2 Sheets-Sheet 1
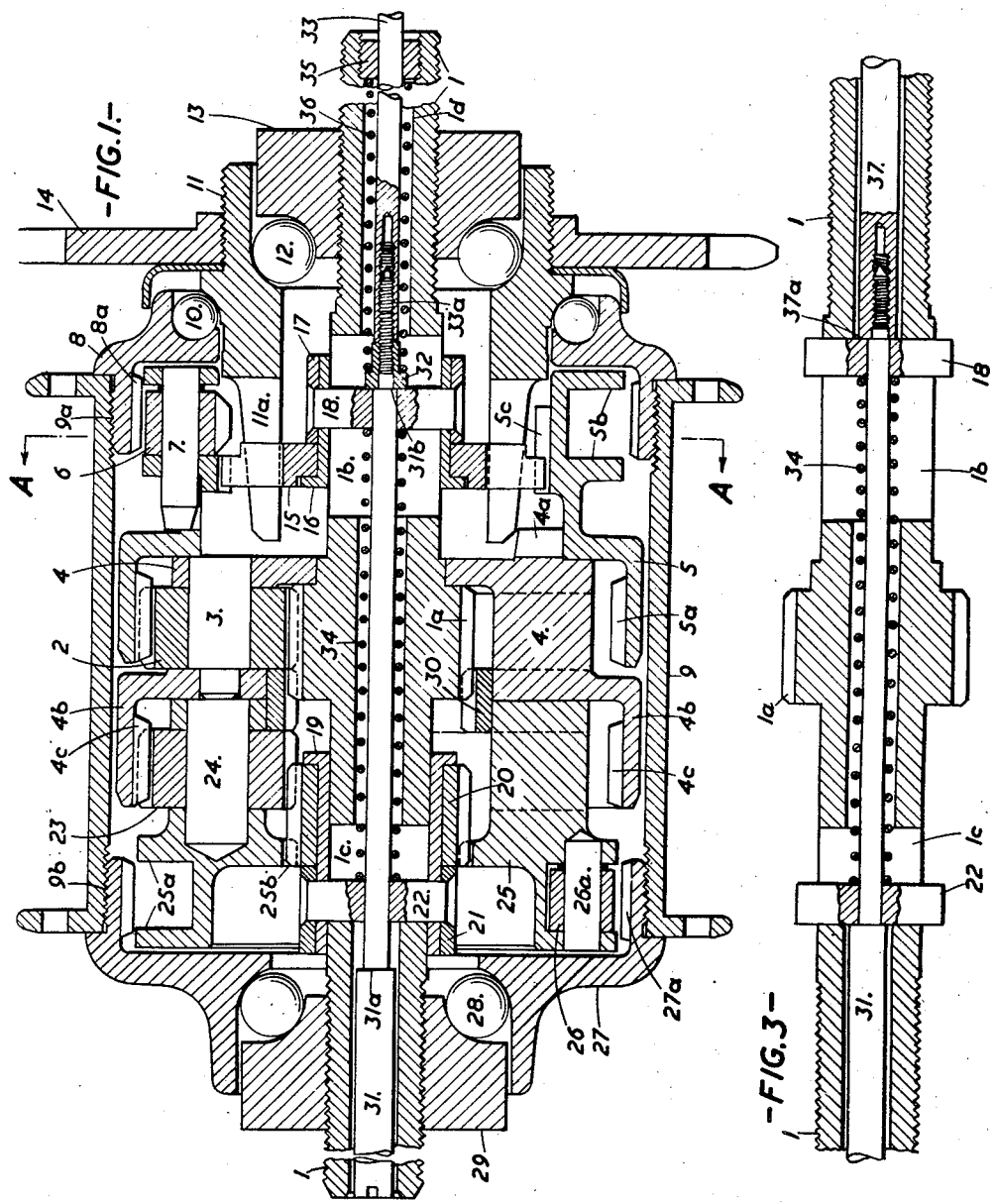
Inventor
William Brown
By
Attorney

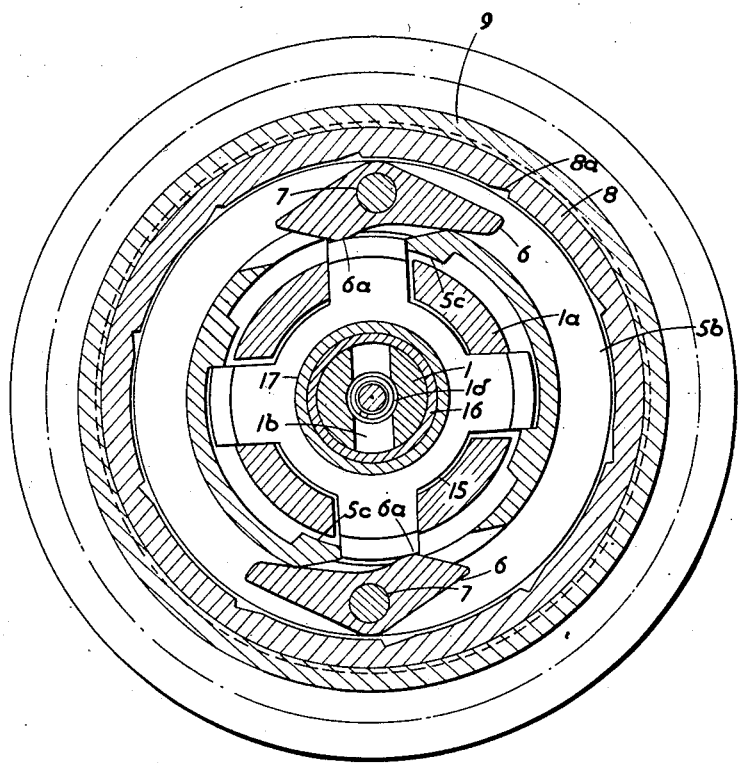

United States Patent Office 2,769,354
Patented Nov. 6, 1956

2,769,354

EPICYCLIC CHANGE SPEED GEARS

William Brown, Nottingham, England, assignor to Sturmey Archer Gears Limited, Nottingham, England, a British company Application September 29, 1955, Serial No. 537,498

5 Claims. (Cl. 74—767)

This invention relates to epicyclic change-speed gears for the wheel hubs of pedal cycles of the kind having primary and secondary epicyclic gear trains coupled together, input coupling selector means associated with the primary gear train, and alternative uni-directional output coupling means one of which is adapted to be rendered inoperative by the input selector so that by the engagement of the other output coupling means a reduction ratio is obtained.

Change-speed gears of the kind aforesaid are already well known and in use and examples thereof are described and illustrated in earlier patents. Hitherto, the secondary gear train has been added for the purpose of obtaining a close-ratio gear by coupling the parts of the two gear trains together so that the sun and planet carrier of the primary gear train are coupled to suitable members of the secondary gear train whereby through an alternative output coupling the planet carrier of the secondary gear train could provide a closer ratio somewhere between the normal reduction ratio of the primary gear train and a direct drive, with the option in some instances of being able to obtain also the said normal reduction ratio of the primary gear train.

The object of the present invention is a new combination and arrangement of parts so as to provide a change-speed gear of the kind aforesaid having a new range of gear ratios.

According to the invention, an epicyclic change-speed gear for the wheel hub of a bicycle of the kind having primary and secondary epicyclic gear trains coupled together, the primary gear train comprising a fixed sun wheel, an annulus and planet wheels supported by a planet carrier and together forming a primary epicyclic gear train, an input member, input coupling means for coupling the input member selectively to the said planet carrier or annulus, an output member, a first unidirectional output coupling means for coupling the annulus to the output member, said output coupling means being adapted to be rendered inoperative by the input coupling means in one position thereof while the latter couples the input member to the annulus, the secondary epicyclic gear train consisting of a sun wheel, an annulus and planet wheels supported by a planet carrier, a second unidirectional output coupling means for connecting the planet carrier of the secondary gear train to the output member when the first output coupling member is rendered inoperative, characterised in that the planet carrier of the primary gear train is coupled to the annulus of the secondary gear train, and further characterised by selector coupling mans for the secondary gear train alternatively adapted for locking the sun pinion of the secondary gear train to a stationary part of the gear or for freeing the said sun pinion and simultaneously locking together two of the aforesaid elements of the secondary gear train whereby while the first unidirectional output coupling is held inoperative, the selector coupling means of the secondary gear train may be operated to provide alternative reduction ratios.

The epicyclic change speed gear aforesaid may be further characterised in that the stationary member to which the secondary sun pinion can be coupled is the primary sun pinion.

In the accompanying drawings:

Figure 1 shows a longitudinal section of a variable gear hub according to one form of the invention;

Figure 2 shows a section on AA of Figure 1, and

Figure 3 shows an alternative control mechanism.

As shown in Figs. 1 and 2 a variable hub gear according to one form of the invention comprises a fixed axle 1 on which there is formed a sun pinion 1a of a primary epicyclic gear train. Meshing with this sun pinion are planet pinions 2 carried on pins 3 in a planet carrier 4. The planet carrier 4 is provided with dogs 4a at one end and is extended at 4b at the other end into an annular form in which are gear teeth 4c forming the annulus of a secondary epicyclic gear train. The primary epicyclic train is completed by an annulus 5 in which are gear teeth 5a. An extension of this annulus carries flanges 5b between which are mounted main output pawls 6 on pins 7, the pawls 6 being formed with tail extensions 6a. Surrounding the annulus flanges 5b is an output member in the form of a wheel hub shell 9 screw threaded at 9a to hold an end cap 8. Such end cap 8 is formed internally with ratchet teeth 8a which co-act with the pawls 6. The end cap 8 is mounted on ball bearings 10 on an input member 11 which in turn is mounted on ball bearings 12 on a bearing cone 13 which is screwed on the axle 1. The input member carries a driving sprocket 14 secured thereto in any suitable known manner. Prongs 11a extending from the input member 11 engage a sliding clutch member 15 which is mounted on a sleeve 16 the clutch member 15 being retained on the sleeve by a ring 17 and cross pin 18. The pin 18 is slidably located in a slot 1b of the axle and is capable of axial movement therein.

Adjacent to the sun pinion 1a is a sleeve 19 slidably mounted on the axle 1 and on which is rotatably mounted a further sun pinion 20 for the secondary epicyclic gear train. A ring 21 and cross pin 22 retain the sun pinions 20 on the sleeve, the pin 22 lying in a slot 1c of the axle 1 and being capable of axial movement therein. Completing this secondary gear train by meshing with the sun pinion 20 and annulus 4c are planet pinions 23 carried on pins 24 in a carrier 25. Between flanges 25a of the carrier 25 are alternative output pawls 26 mounted on pins 26a. The carrier 25 is also formed with internal teeth 25b adapted to be engaged by the sun pinion 20. Surrounding the carrier flanges 25a is an end cap 27 which is screwed into the other end of the hub shell 9 at 9b. This end cap is mounted on ball bearings 28 on a bearing cone 29 which is screwed on the axle 1. This end cap is formed internally with ratchet teeth 27a which co-act with the pawls 26. Lying between the planet pinions 2 and 23 of the two gear trains is an internally toothed ring 30 which engages with the sun pinion 1a, lateral movement being prevented by the pinions 2 and 23.

Lying within the hole 1d of the axle 1 is a rod 31 provided with a shoulder 31a, the reduced portion of the rod passing through holes in the cross pins 22 and 18. A further shoulder 31b on the rod 31 abuts against a collar 32 and the rod 31 is screwed into a further rod 33 at 33a. Surrounding the reduced portion of the rod 31 and lying between the cross pins 22 and 18 is a spring 34, and between the collar 32 and a collar 35 screwed into the axle 1 is a further spring 36, this spring being stronger than spring 34.

The operation of the gear is as follows:

*Increase gear ratio.*—Since the spring 36 is stronger than spring 34 the cross pins 22 and 18 are normally urged to their left-most position. The sun pinion 20 is thereby engaged with internal teeth 25b of the planet carrier 25 as well as with the planet pinions 23 so rendering this secondary gear train inoperative while enabling it to rotate en bloc with the carrier 4 of the primary gear train. The clutch member 15 engaging with the dogs 4a of the carrier 4 transmits the input torque from the prongs 11a of the member 11 via the pinions 2 to the annulus 5 and through the main output pawls 6 and splines 8a of the end cap 8 to the hub shell 9. Since the annulus 5 rotates faster than the carrier 4 an increase gear is obtained and the ratchet teeth 27a of the end cap 27 rotating at the same speed as the annulus 5 over-run the pawls 26.

*Direct drive.*—By moving the rod 33 to the right so as to take up the position shown in Fig. 1 the spring 34 retains the pin 22 to the left of the slot 1c as before but the pin 18 takes up the position shown moving the clutch member 15 with it to engage the internal splines 5c of the annulus 5. The torque from the prongs 11a of the input member 11 is thus transmitted directly to the annulus 5 and via the main output pawls 6 to the end cap 8 and hub shell 9. The ratchet teeth 27a will over-run the pawls 26 as before.

*First reduction gear ratio.*—Further movement of the rod 33 to the right brings the shoulder 31a into contact with the cross pin 22 but does not move it. The cross pin 18 carries the clutch member 15 further along the internal splines 5c of the annulus 5 until it lies in line with the main output pawls 6 and by engaging with the tail extensions 6a of the pawls, trips them out of engagement with the ratchet teeth 8a. The torque from member 11 is thus transferred via the annulus 5 and pinions 2 to the carrier 4. Since sun pinion 20 is still engaged with carrier 25 through the internal teeth 25b, the secondary gear train rotates en bloc with carrier 4 and the pawls 26 in carrier 25 transmit the torque via the ratchet teeth 27a to the end cap 27 and thereby to the hub shell 9. These three gear ratios are those normally provided by the primary epicyclic gear train alone.

*Second reduction gear ratio.*—Further movement of the rod 33 to the right causes the shoulder 31a of the rod 31 to move the cross pin 22 to the right and with it the sun pinion 20 so as to disengage it from the teeth 25b of the carrier 25 and to engage it with the internal teeth of the sleeve 30, thus locking the secondary sun pinion 20 to the primary sun pinion 1a and thereby to the axle 1. No movement of the cross pin 18 takes place as it has already reached with the preceding movement of the rod 31, the extreme right hand end of the slot 1b. The torque from the prongs 11a of the input member 11 is still transmitted via the annulus 5 through the pinions 2 to the carrier 4 but since the secondary sun pinion 20 is now fixed to the axle 1 against rotation the torque proceeds via the annulus 4b through the pinions 23 to the carrier 25 so giving a further gear reduction in addition to that provided by the first train. The final drive to the hub shell 9 is through the pawls 26, ratchet teeth 27a and end cap 27 as for the first reduction gear ratio. This gear is, therefore, provided by the combined action of the two epicyclic gear trains acting in series, the simple reduced ratio output of the primary gear train being further reduced by the simple reduction ratio of the secondary epicyclic gear train.

As an example of the gear ratios obtained, if both primary and secondary epicyclic gear trains have a ratio of annulus teeth to sun wheel teeth of 3 to 1, a usual figure for hub gears of the type described, then the increase gear ratio will be as 4 to 3, direct drive will be 1 to 1, first reduction gear ratio will be 3 to 4 and the second reduction gear ratio will be 9 to 16. These ratios can of course be varied as required in any known manner, as by varying the size and number of teeth in the gears or by using stepped pinions, without departing from the invention.

An alternative control mechanism is shown in Fig. 3. Here the two cross pins 22 and 18 are biased by the spring 34 to the outward extremities of slots 1c and 1b of the axle 1. This gives the first reduction gear position. The rod 31 is as before but a further rod 37 is screwed to rod 31 so as to provide the shoulder 37a. Pushing or pulling the combined rods 31, 37 to left or right as required then gives the required other gear positions. Other alternative springings are of course possible or if desired independent control means may be provided for the two cross pins.

I claim:

1. An epicyclic change-speed gear for the wheel hub of a bicycle of the kind having primary and secondary epicyclic gear trains coupled together, the primary gear train comprising a fixed sun wheel, an annulus and planet wheels supported by a planet carrier and together forming a primary epicyclic gear train, an input member, input coupling means for coupling the input member selectively to the said planet carrier or annulus, an output member, a first unidirectional output coupling means for coupling the annulus to the output member, said output coupling means being adapted to be rendered inoperative by the input coupling means in one position thereof while the latter couples the input member to the annulus, the secondary epicyclic gear train consisting of a sun wheel, an annulus and planet wheels supported by a planet carrier, a second unidirectional output coupling means for connecting the planet carrier of the secondary gear train to the output member when the first output coupling member is rendered inoperative, characterised in that the planet carrier of the primary gear train is coupled to the annulus of the secondary gear train, and further characterised by selector coupling means for the secondary gear train alternatively adapted for locking the sun pinion of the secondary gear train to a stationary part of the gear or for freeing the said sun pinion and simultaneously locking together two of the aforesaid elements of the secondary gear train whereby while the first unidirectional output coupling is held inoperative the selector coupling means of the secondary gear train may be operated to provide alternative reduction ratios.

2. An epicyclic change-speed gear according to claim 1 further characterised in that the selector coupling means for the secondary gear train is provided by making the secondary sun pinion rotatably mounted and axially slidable on a stationary part of the gear and providing complementary clutch formations alternatively engageable by the sun pinion respectively on the secondary planet carrier and on a stationary part of the gear.

3. An epicyclic change-speed gear according to claim 2 further characterised by an internally toothed ring permanently in part engaged with the stationary sun pinion of the primary gear train and engageable in part by the teeth of the slidable secondary sun pinion so as to form the stationary part of the gear and complementary clutch formations therefor.

4. An epicyclic change-speed gear comprising a fixed axle, a fixed sun pinion thereon, a primary epicyclic gear train including said sun pinion and consisting of planet wheels, planet carrier and annulus mounted about said axle, an input member adjacent the primary gear train journalled on said axle, a wheel hub journalled at one end on said axle and at the other end on said input member, an input selector slidably associated with the driving member and engageable alternatively with the planet carrier or annulus of the primary gear train, means for moving the selector to alternative positions, a unidirectional output coupling carried by the annulus of the primary gear train engageable with the wheel hub and adapted to be uncoupled by the input selector in one position while such selector is engaged with the annulus, a secondary epicyclic gear train mounted on the axle including a sun pinion slidably and rotatably mounted on the axle, secondary planet pinions, a secondary planet carrier and a secondary annulus the latter permanently coupled to the planet carrier of the primary gear train, a unidirectional output coupling carried by the secondary planet carrier and engageable with the wheel hub, a set of internally formed teeth on the secondary planet carrier engageable by the secondary sun pinion at one end of its movement, an internally toothed ring partly engaged with the primary sun pinion and located between the primary and secondary planet pinions having its other part engageable by the slidable secondary sun pinion at the other end of its movement, and means for sliding the secondary sun pinion.

5. An epicyclic change-speed gear according to claim 4 characterised in that the means for sliding the secondary sun pinion comprises a rod attached to the means for moving the input selector and spring means normally holding the secondary sun pinion in its position of engagement with the secondary planet carrier.

References Cited in the file of this patent

UNITED STATES PATENTS 994,359  Archer _____ June 6, 1911